United States Patent
Peiffer et al.

(10) Patent No.: US 6,194,054 B1
(45) Date of Patent: Feb. 27, 2001

(54) BIAXIALLY ORIENTED POLYESTER FILM WITH HIGH OXYGEN BARRIER, ITS USE, AND PROCESS FOR ITS PRODUCTION

(75) Inventors: Herbert Peiffer, Mainz; Gottfried Hilkert, Saulheim, both of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/089,087

(22) Filed: Jun. 2, 1998

(30) Foreign Application Priority Data

Jun. 4, 1997 (DE) .............................. 197 23 468

(51) Int. Cl.[7] .............................. B32B 5/02; B32B 15/08; B32B 19/04; B32B 27/06; B32B 27/36
(52) U.S. Cl. .......................... 428/141; 428/323; 428/332; 428/339; 428/458; 428/480; 428/910
(58) Field of Search .................... 428/141, 323, 428/332, 339, 480, 458, 910

(56) References Cited

U.S. PATENT DOCUMENTS

| 3,515,626 | 6/1970 | Duffield | 428/325 |
|---|---|---|---|
| 3,958,064 | 5/1976 | Brekken et al. | 428/336 |
| 5,506,014 | 4/1996 | Minnick | 428/35.7 |
| 5,656,356 | * 8/1997 | Masuda et al. | 428/141 |
| 5,856,017 | * 1/1999 | Matsuda et al. | 428/446 |

FOREIGN PATENT DOCUMENTS

| 0 061 769 B1 | 10/1982 | (EP) . |
|---|---|---|
| 0 088 635 B1 | 9/1983 | (EP) . |
| 0 124 291 A2 | 11/1984 | (EP) . |
| 0 490 665 A1 | 6/1992 | (EP) . |
| 0 502 745 B1 | 9/1992 | (EP) . |
| 0 602 964 A1 | 6/1994 | (EP) . |

OTHER PUBLICATIONS

H. Utz (Munich Technical University, 1995:"Barriereeigenschaften aluminiumbedampfter Kuststoffolien [Barrier properties of aluminium–metallized plastic films]").

von Weiss (cf. "Thin Solids Films" 204 (1991), pp. 203–216

* cited by examiner

*Primary Examiner*—Paul Thibodeau
*Assistant Examiner*—Ramsey Zacharia (57) ABSTRACT

The invention relates to a metallized or ceramically coated, biaxially oriented polyester film with high oxygen barrier and built up from at least one base layer B and, applied to this base layer, at least one outer layer A, where this outer layer A has a defined number of elevations of defined height and diameter, and where at least this outer layer A is metallized or ceramically coated. The invention also relates to the use of the film and to a process for its production.

12 Claims, 8 Drawing Sheets

Figure 5A:
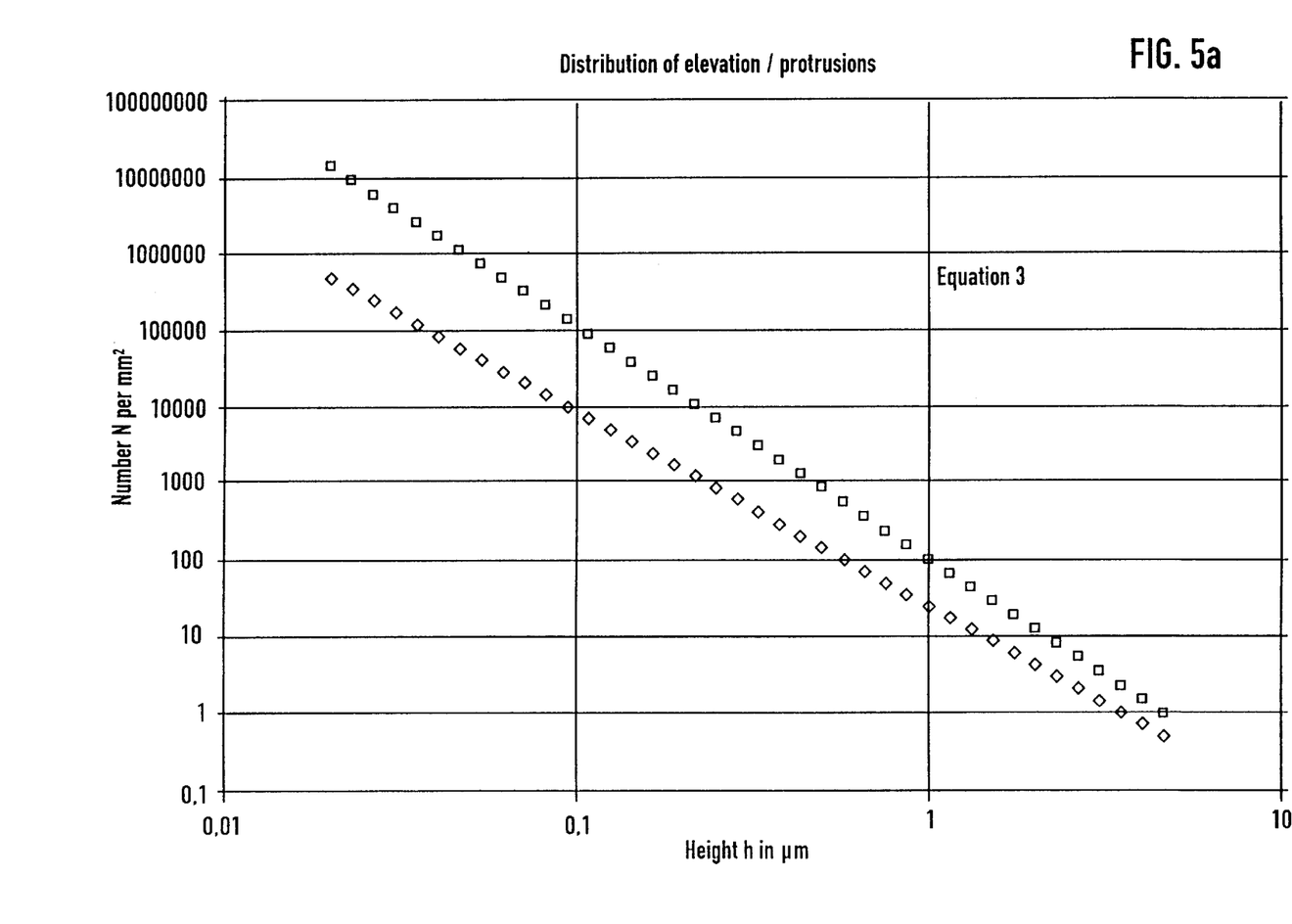
Figure 5B:
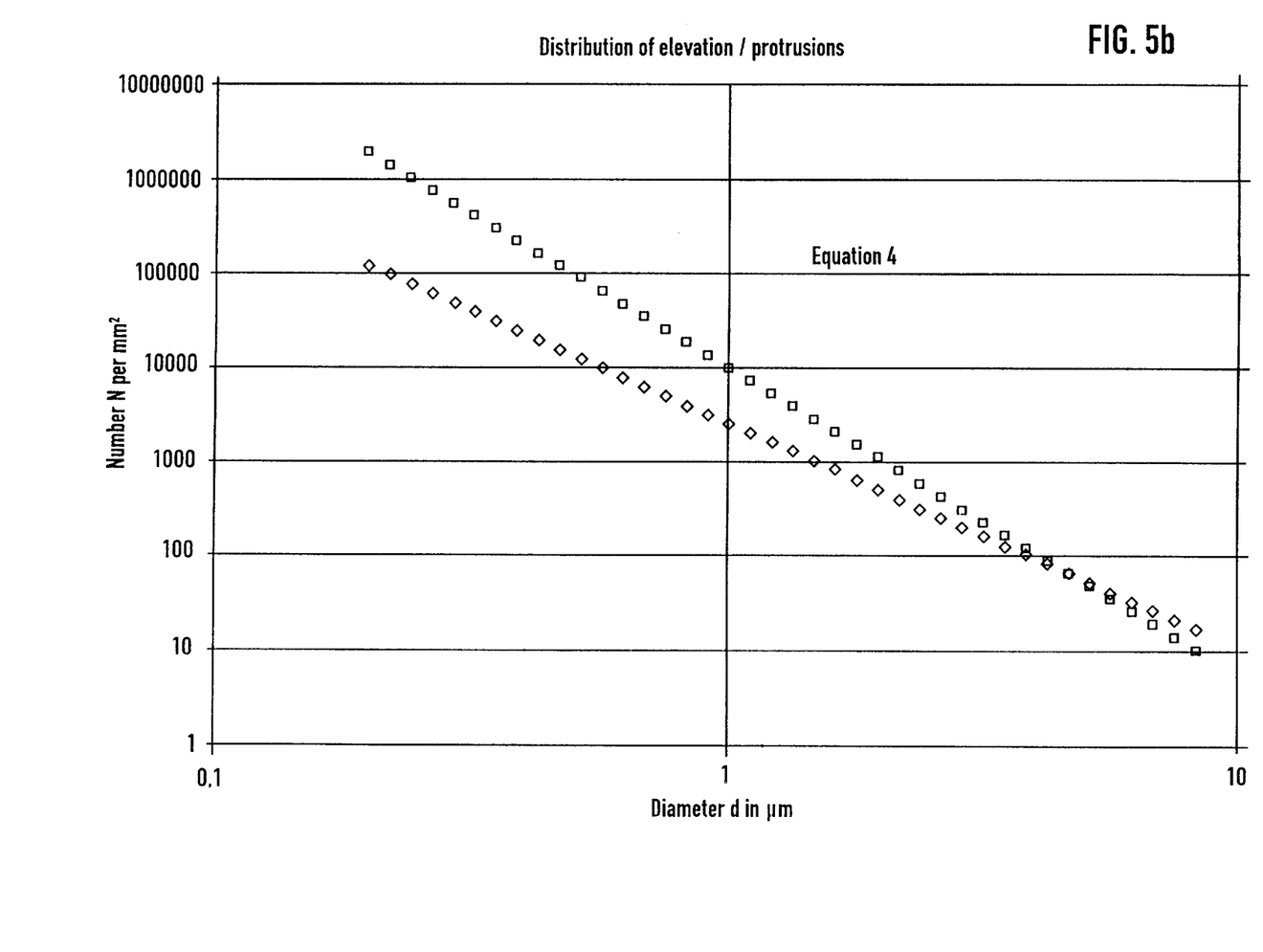

FIG. 5b ized or ceramically coated, biaxially oriented polyester film with high oxygen barrier and built up from at least one base layer B and, applied to this base layer, at least one outer layer A, where this outer layer A has a defined number of elevations (the terms elevation and protrusion are used interchangeably throughout) of defined height and diameter, and where at least this outer layer A is metallized or ceramically coated. The invention also relates to the use of the film and to a process for its production.

BIAXIALLY ORIENTED POLYESTER FILM WITH HIGH OXYGEN BARRIER, ITS USE, AND PROCESS FOR ITS PRODUCTION

BACKGROUND OF THE INVENTION

1) Field of the Invention

The invention relates to a metallized or ceramically coated, biaxially oriented polyester film with high oxygen barrier and built up from at least one base layer B and, applied to this base layer, at least one outer layer A, where this outer layer A has a defined number of elevations (the terms elevation and protrusion are used interchangeably throughout) of defined height and diameter, and where at least this outer layer A is metallized or ceramically coated. The invention also relates to the use of the film and to a process for its production.

2) Prior Art

In many foodstuff packaging applications, there is demand for a high barrier effect against gases, steam and flavors (this having the same significance as low transmission or low permeability). A well known process for producing packaging of this type consists in high-vacuum aluminum metallizing of the plastic films used. Another well known process consists in coating the films with ceramic materials (e.g. $SiO_x$, $AlO_x$ or $MgO_x$). Essentially, the coatings used are transparent.

The barrier effect against the substances mentioned above depends essentially on the type of polymers in the film and the quality of the barrier layers applied. Thus a very high barrier effect against gases, such as oxygen and flavors, is achieved in metallized, biaxially oriented polyester films. A barrier effect against steam is achieved in metallized, biaxially oriented polypropylene films.

The good barrier properties of metallized or ceramically coated films mean that they are used in particular for packaging foodstuffs and luxury foods, for which long storage or transport times create the risk that the packed foodstuffs become spoilt, rancid or lose flavor if there is an inadequate barrier; examples are coffee, snacks containing fats (nuts, chips, etc.) and drinks containing carbon dioxide (in pouches).

If polyester films metallized with an aluminum layer or having an applied ceramic layer are used as packaging material, they are generally a constituent of a multilayer composite film (laminate). Bags produced therefrom can be filled, for example, on a vertical tubular bag forming, filling and sealing machine (vffs). The bags are heat-sealed on their inward side (i.e. on the side facing the contents), the heat-sealable layer consisting generally of polyethylene or polypropylene. The composite film here typically has the following structure: polyester layer/aluminum or ceramic layer/adhesive layer/heat-sealable layer. If the laminate thickness is from about 50 to 150 μm, the thickness of the metal or ceramic layer is only from 10 to 80 nm. Even this very thin layer is sufficiently effective to achieve adequate protection from light and very good barrier properties.

The oxygen barrier or the oxygen transmission is generally measured not on the laminate or the packaging itself, but on the metallized polyester film. To ensure good quality of the foodstuffs or luxury foods even after relatively long storage times, the oxygen transmission (identical with permeability) of the metallized film may not be greater than 2 $cm^3/m^2$ bar d, (i.e. not greater than 2 cubic centimeters of oxygen per square meter of film at a pressure of 1 bar per day) but in particular not greater than 1 $cm^3/m^2$ bar d. In future, the demands of the packaging industry will head toward still higher barriers, with attempts to achieve permeability values of significantly less than 1.0 $cm^3/m^2$ bar d for metallized or ceramically coated films.

In the prior art, there is neither sufficient knowledge of the detailed basis for the barrier effect of metallized or ceramically coated polyester films nor of how this may be decisively improved. Variables which are clearly important are the surface of the substrate and the type of substrate polymer and its morphology. It is generally assumed that smooth substrate surfaces result in better barrier properties.

In this connection, Weiss et al., in "Thin Solids Films" 204 (1991), pp. 203–216, studied the influence of the surface roughness of a substrate layer on its permeability. For this, polyester films were coated with lacquer which contained various concentrations of titanium dioxide particles. In his experiments, the concentration of titanium dioxide particles in the lacquer was varied from 2 to 20% by weight. Using this method, the surface roughness of the coated substrate surface could be varied from 43 nm (unlacquered and lacquered film, without titanium dioxide) to 124 nm. In his experiments, increasing roughness (increasing proportion of $TiO_2$) of the lacquered surface resulted in markedly higher oxygen transmissions after metallizing with aluminum. However, the largest step increase in oxygen transmission was seen when the lacquered film (0% by weight $TiO_2$) was compared with the unlacquered film, although the surface roughness of the substrate was the same in both cases. The lacquering alone of the film gave a deterioration in the barrier from about 0.43 $cm^3/m^2$ d bar (plain film) to about 19 $cm^3/m^2$ d bar (lacquered film). A further disadvantage of his studies was that the aluminum layer was applied using a laboratory evaporator. When compared with an industrial metallizer, this method achieves essentially low permeability values, and the influence of the substrate surface cannot be seen clearly.

Other detailed results of studies on the influence of the substrate surface of polyester films on their barrier properties can be found in the dissertation by H. Utz (Technische Universität München 1995: "Barriereeigenschaften aluminiumbedampfter Kunststoffolien" [Barrier properties of aluminum-metallized plastic films]).

According to the studies by Utz (p. 66 ff.), there is no direct correlation between the surface roughness (average roughness height $R_a$) of the PET film and its oxygen barrier. For example, the film for video applications which has an average roughness height of $R_a=22$ nm, is particularly smooth and has an oxygen transmission of 1.3 $cm^3/m^2$ bar d compared with a much rougher PET II ($R_a=220$ nm) film having an oxygen barrier of 1.2 $cm^3/m^2$ bar d.

EP-A-0 124 291 describes a single-layer biaxially oriented polyester film for magnetic recording tape which has the following surface property parameters a) the average roughness $R_a$ is from 1 to 16 nm, b) the coefficient of friction μk is from 0.01 to 0.20 and c) the following relationship exists between $R_a$ and μk $$0.1 \leq 10 * R_a + \mu k \leq 0.31.$$

These properties are created by using $TiO_2$ particles (anatase) or $TiO_2$ and $CaCO_3$ particles in a proportion by weight of, respectively, from 0.1 to 0.5% and from 0.1 to 0.3%. The diameter of the $TiO_2$ particles is from 0.1 to 0.5 μm. The surface of this film is formed by a large number of elevations/protrusions ("the excellent slipperiness of the polyester film of this invention is simultaneously achieved by the presence of the many very minute protrusions") and these obey a distribution such that the graph described by the following relationship $$\log y = -8.0\, x + 4.34,\ y > 10$$

is not intersected. In this equation, x ($\mu$m) is a height above a standard level and y is the number of elevations (number/mm$^2$) if the elevations are sectioned at a height of x. The distribution of the elevations is determined using standard equipment for measuring roughness.

EP-A-0 490 665 A1 describes a single-layer biaxially oriented polyester film for magnetic recording tape; the film contains
  a) from 0.05 to 1.0% by weight of θ-alumina (theta aluminum) having an average particle diameter in the range from 0.02 to 0.3 $\mu$m, and
  b) from 0.01 to 1.5% by weight of inert particles of a type other than θ-alumina and having an average particle diameter in the range from 0.1 to 1.5 $\mu$m, these particles being larger than the θ-alumina particles.

The surface of this film is formed by a large number of elevations/protrusions which are described by the relationship $$-11.4\, x + 4 < \log y < -10.0\, x + 5\ \ y > 30,\ x > 0.05\ \mu m.$$

In this equation, x ($\mu$m) is a height above a standard level and y is the number of elevations (number/mm$^2$) if the elevations are sectioned at a height of x. The distribution of the elevations is measured as in EP-A-0 124 291.

The prior art also discloses films which have different surfaces (dual surface). These films are suitable in particular for magnetic recording media and essentially have different topographies (e.g. surface A smooth, surface B rough).

DE-A-16 94 404 describes a layered material having more than one layer of an oriented crystallizable thermoplastic film and in which at least one of the outer layers contains an additive. The additives are customary inert inorganic or organic particles, and in the case of inert particles such as SiO$_2$, are added to the outer layers in concentrations of from 1 to 25% by weight, the particle size being from 2 to 20 $\mu$m. The layered materials may, for example, be metallized with aluminum for decorative purposes or used for magnetic tape.

DE-A-22 30 970 describes a magnetic recording medium which is composed of a biaxially oriented polyester film and a thin magnetic metallic layer on the surface A of the polyester film. The film comprises
  a) a coated surface A, which is free from particles and
    i) is at least 4 $\mu$m thick or
    ii) makes up at least 50% of the thickness of the entire film layer; and
  b) a second layer containing particles and having relatively rough surface and composed of
    i) at least 1% of individual particles of a particular polymer A and
    ii) at least 1% of individual particles of a particular polymer B.

EP-B-0 061 769 describes a magnetic recording medium which is formulated from a biaxially oriented polyester film and a thin magnetic metallic layer on the surface A of the polyester film. If desired, there is also a lubricant layer on the other surface B of the polyester film. Features of the film are that the coated surface A
  a) has an average roughness R$_a$ (peak-valley value) of not more than 5 nm (60 nm),
  b) the number of protrusions having a height of from 0.27 to 0.54 $\mu$m is from 0 to 0.2 per mm$^2$ and
  c) is free from protrusions having a height greater than 0.54 $\mu$m.

EP-B-0 088 635 describes a coextruded biaxially oriented polyester film having at least two layers, of which a layer A consists of thermoplastic resin and a layer B comprises thermoplastic resin and fine particles. The surface roughness R$_a$ of the outer layer on the layer A in the film is less than 5 nm and the outer surface of the layer B is either
  i) a surface having a surface roughness R$_a$ of from 5 to 40 nm and a large number of depressions and a large number of protrusions which are arranged in a particular arrangement or
  ii) a surface which has protrusions formed on a level area and which is covered by a layer C, which consists of a lubricant and has a surface roughness R$_a$ of from 5 to 40 nm.

According to Example 1 of this text, the surface layer A is "substantially free of internal particles formed by reaction of the catalyst residue . . . (page 7)". A disadvantage of this film surface is that it blocks with itself and with certain other surfaces (e.g. rubber rolls). The film cannot be processed cost-effectively and, in particular during vacuum metallizing, it tends to tear because of its high blocking tendency, and this can cause great cost problems. The film is unsuitable for the purposes of the object to be achieved.

EP-B-0 502 745 describes a coextruded, biaxially oriented polyester film having at least three layers, of which an outer layer A
  a) contains inorganic particles having an average primary particle size D in the range from 1 to 100 nm and satisfying the equation D<T<200D, where T is the thickness of the layer A;
  b) contains particles B having an average primary particle size D1 in the range from 0.3 to 2 $\mu$m, where the primary particle size distribution has a coefficient of variation of not more than 0.6; and
  c) the average primary particle size D of the particles A is smaller than the average primary particle size D1 of the particles B.

It is also known that the oxygen barrier can be improved by selecting particular polymers for the film serving as substrate (Schricker, G.: Metallisierte Kunststoffolien für höherwertige Verpackungen [Metallized plastic films for high-quality packaging] in: ICI 5th International Metallizing Symposium 1986, Cannes). Polyesters, for example, are particularly suitable, specifically those made from ethylene glycol and terephthalic acid or from ethylene glycol, terephthalic acid and naphthalene-2,6-dicarboxylic acid. Besides these, polyamides, ethylene-vinyl alcohol copolymers (EVOH) and polyvinylidene chloride may also be used with practical advantage. Thus, for example, U.S. Pat. No. 5,506, 014 describes a copolyester made from: (a) from 45 to 85 mol % of terephthalic acid; (b) from 10 to 40 mol % of naphthalenedicarboxylic acid; (c) from 5 to 15 mol % of a dicarboxylic acid having from 2 to 8 carbon atoms; and (d) ethylene glycol; (the molar percentages are based on the total proportion of dicarboxylic acids). This polyester is claimed to have better barrier properties against gases. It is used, inter alia, for producing bottles or containers and films of various thicknesses. A disadvantage of the raw materials mentioned is that they are significantly more expensive than polyethylene terephthalate (PET) or are unsuitable and/or not officially permitted for use in the packaging of foodstuffs.

It is an object of the present invention to provide a metallized or ceramically coated, coextruded, biaxially oriented polyester film which exhibits a high oxygen barrier. Less than 0.5 cm³ of oxygen per square meter and per day should diffuse through the film when it is subjected to an air pressure of 1 bar. In its other properties, the film should be at least equivalent to the known packing films of this type. Moreover it should be simple and economic to produce and should process well on conventional machinery (i.e. not block, for example). It was also an object to improve the optical properties (i.e. in particular the gloss) of the metallized or ceramically coated film.

SUMMARY OF THE INVENTION

The object is achieved by means of a coextruded biaxially oriented polyester film having a base layer composed of at least 80% by weight of a thermoplastic polyester and one or more outer layers, where at least one outward-facing outer layer contains internal and/or inert particles and is provided with a metallic or ceramic layer, and where the outward-facing outer layer has a number of elevations/protrusions N per mm² of film surface area which is related to their respective heights h and diameters d by the following equations $$\log N/mm^2 \leq A_h - B_h (\log h/\mu m), \ 0.01 \ \mu m < h < 10 \ \mu m \quad (1)$$

$A_h = 1.4; \ B_h = 2.5$ $$\log N/mm^2 \leq A_d - B_d (\log d/\mu m), \ 0.01 \ \mu m < d < 10 \ \mu m \quad (2)$$

$A_d = 3.4; \ B_d = 2.4$

For the purposes of the present invention, elevations/protrusions are conical elevations/protrusions which project from the flat film surface.

For the purposes of the invention, internal particles are catalyst residues which remain in the raw material during preparation of the polyester raw materials.

For the purposes of the invention, inert particles are particles which are added to the raw material, for example during its preparation.

To achieve high oxygen barriers in metallized or ceramically coated films according to the object of the invention, the number N of elevations/protrusions per mm² of outer layer surface must, in accordance with the equations (1) and (2), be below a particular numerical value. This numerical value is uniquely defined by the right-hand side of the equations (1) and (2) as a function of the height h and the diameter d of the elevations/protrusions.

Biaxially oriented polyester films which are described by the equations above have a comparatively low number of elevations/protrusions on the outer layer which is to be metallized or ceramically coated. The number of elevations/protrusions is in the range $h < 0.5 \ \mu m$, in particular $h < 0.4 \ \mu m$ and very particularly $h < 0.3 \ \mu m$ and is markedly lower than is known in the prior art.

Figure 1A:
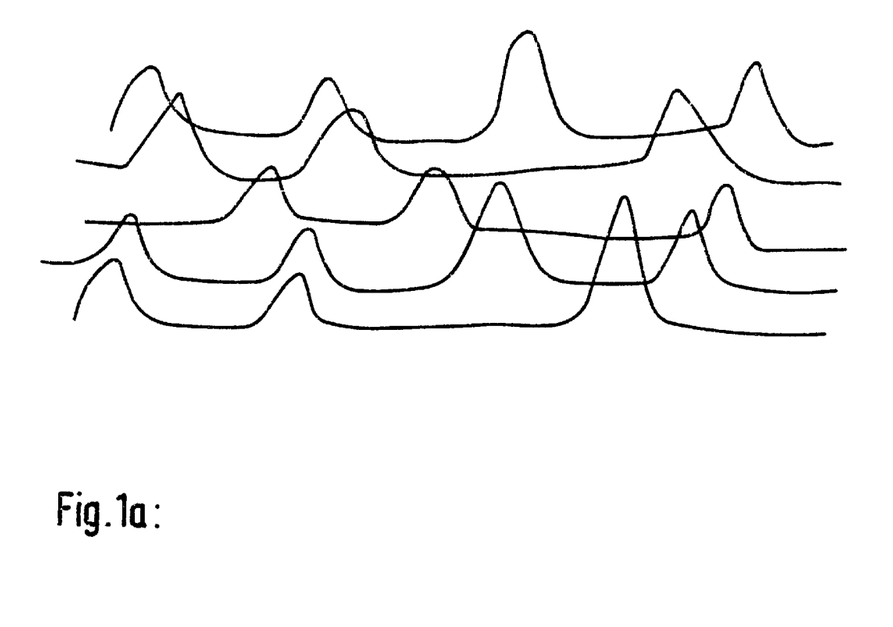
Figure 1B:
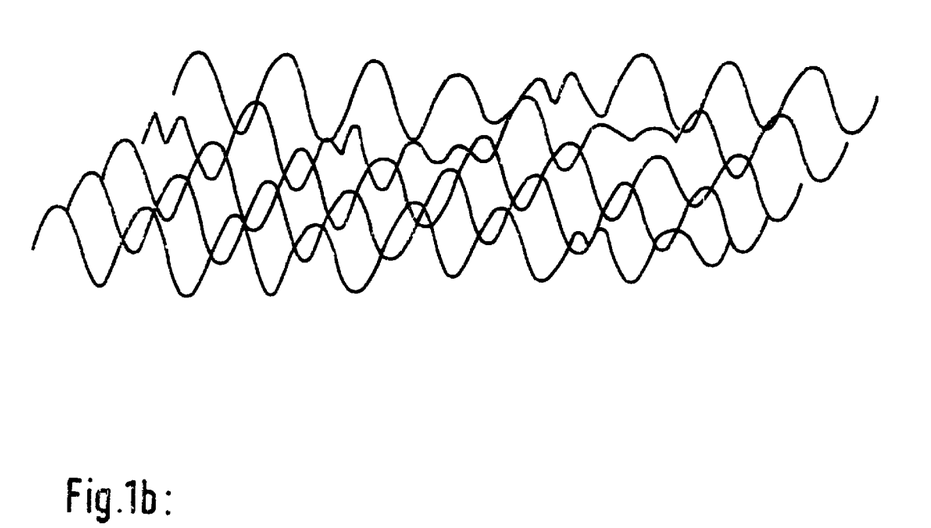

The decisive factors for achieving high oxygen barriers in metallized or ceramically coated films are therefore not low roughness values $R_a$ or $R_z$, but rather a low density $N/mm^2$ of elevations/protrusions on the outer layer surface. FIG. 1 gives a diagrammatic comparison of surfaces which have a) a good oxygen barrier (low permeability values) according to the present invention (FIG. 1a) and b) a low oxygen barrier (high permeability values) (FIG. 1b).

The parameter shown is the average roughness $R_a$, calculated by the following formula $$R_a = 1/L * \int_0^L *f(x)*dx$$

If the density N/mm² of the elevations/protrusions is small (FIG. 1a), the barrier in the above sense is good, and in contrast if the density of the elevations/protrusions is great (FIG. 1b), the barrier in the above sense is then poor. The diagram also shows that in principle the value of $R_a$ has no influence on the barrier properties. A smooth film (e.g. $R_a < 10$ nm) here may exhibit a very poor barrier if the number N/mm² of elevations/protrusions is greater than calculated by the equations (1) and (2). In this case, the surface/surface layer contains very many fine particles, but these do not contribute significantly to the value of $R_a$. A surface of this type is not at all suitable for achieving high barrier values. In contrast, film surfaces which have comparatively few elevations/protrusions N per unit of area of the outer layer are very suitable for achieving high barrier values. It is of relatively subordinate significance here whether the elevations/protrusions are the result of large particles or of small particles.

While the $R_a$ values have no practical significance for the barrier properties, they do have practical significance for the processing of the novel film. $R_a$ on the film surface in accordance with the invention is greater than 6 nm, preferably greater than 8 nm and particularly preferably greater than 10 nm.

$R_a$ of the film surface in accordance with the invention is not greater than 100 nm, advantageously less than 80 nm and particularly advantageously less than 60 nm.

If $R_a$ of the film surface in accordance with the invention is less than 6 nm, the processing of the film becomes difficult. If $R_a$ of the film surface in accordance with the invention is greater than 100 nm, the abrasion resistance of this surface becomes poorer.

If the number N of elevations per unit of surface area on the film outer layer which is to be metallized or ceramically coated is greater than the right-hand side of equation (1) or (2), then the oxygen permeability is greater than 0.5 cm³/m² bar d, and this is undesirable for the object of the present invention.

In an advantageous embodiment of the novel film, the constant $A_h$ of the above mentioned equation (1) has the value 1.18, and in a particularly advantageous embodiment has the value 1.0. In a likewise advantageous embodiment of the novel film, the constant $B_h$ of the above mentioned equation (1) has the value 2.2, and in a particularly advantageous embodiment the value is 2.1.

In an advantageous embodiment of the novel film, the constant $A_d$ of the above mentioned equation (2) has the value 3.0, and in a particularly advantageous embodiment has the value 2.6. In a likewise advantageous embodiment, the constant $B_d$ of the above mentioned equation (2) has the value 2.3, and in a particularly advantageous embodiment the value is 2.2.

In these advantageous embodiments, and in the particularly advantageous embodiments, the outer layer in accordance with the invention has an extremely low number N of elevations/protrusions per unit of surface area. In this case, the metallized or ceramically coated film exhibits a particularly good oxygen barrier. The permeability of the metallized or ceramically coated film is less than 0.4 cm³/m² bar d.

Figure 2A:
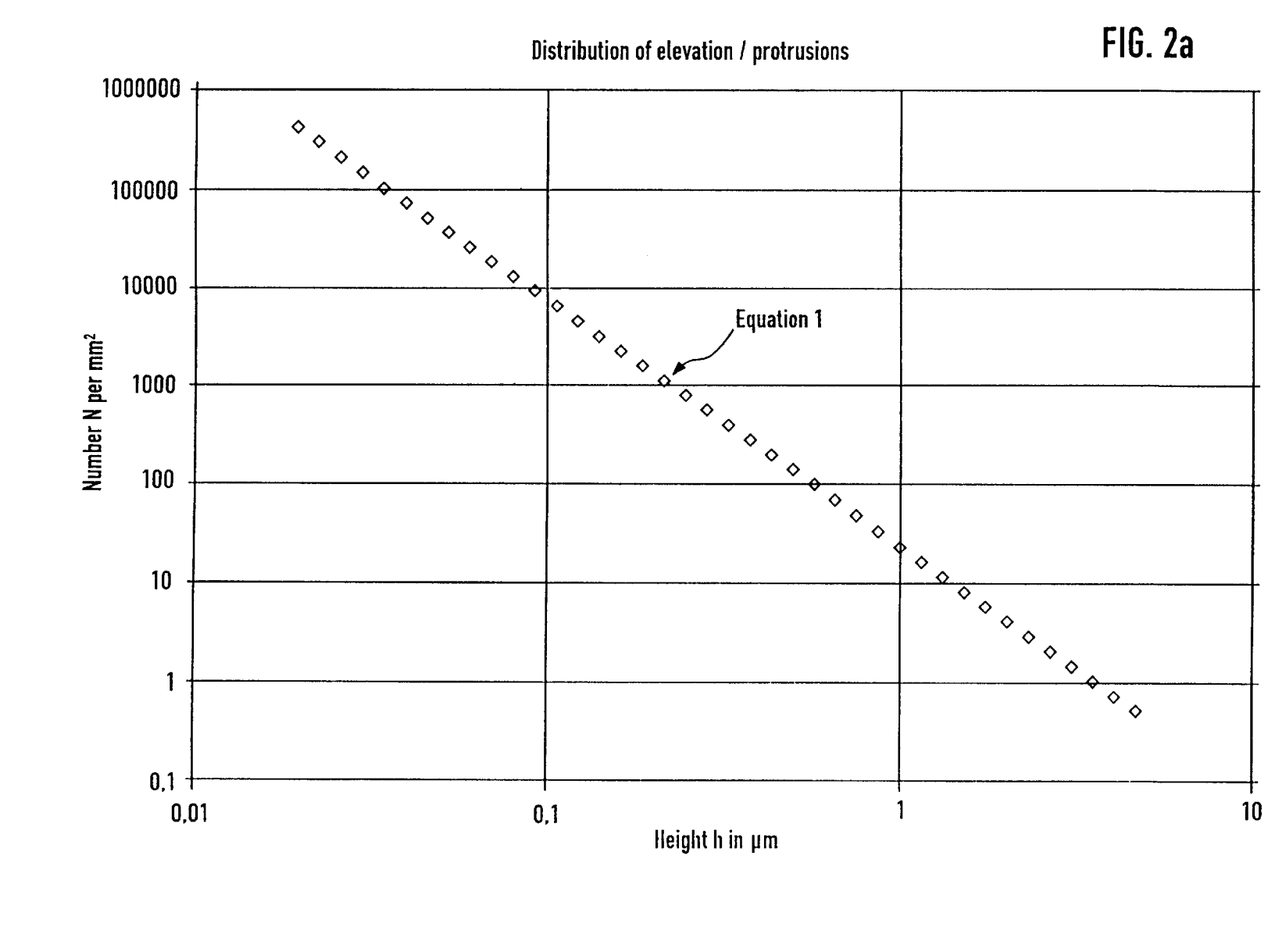
Figure 2B:
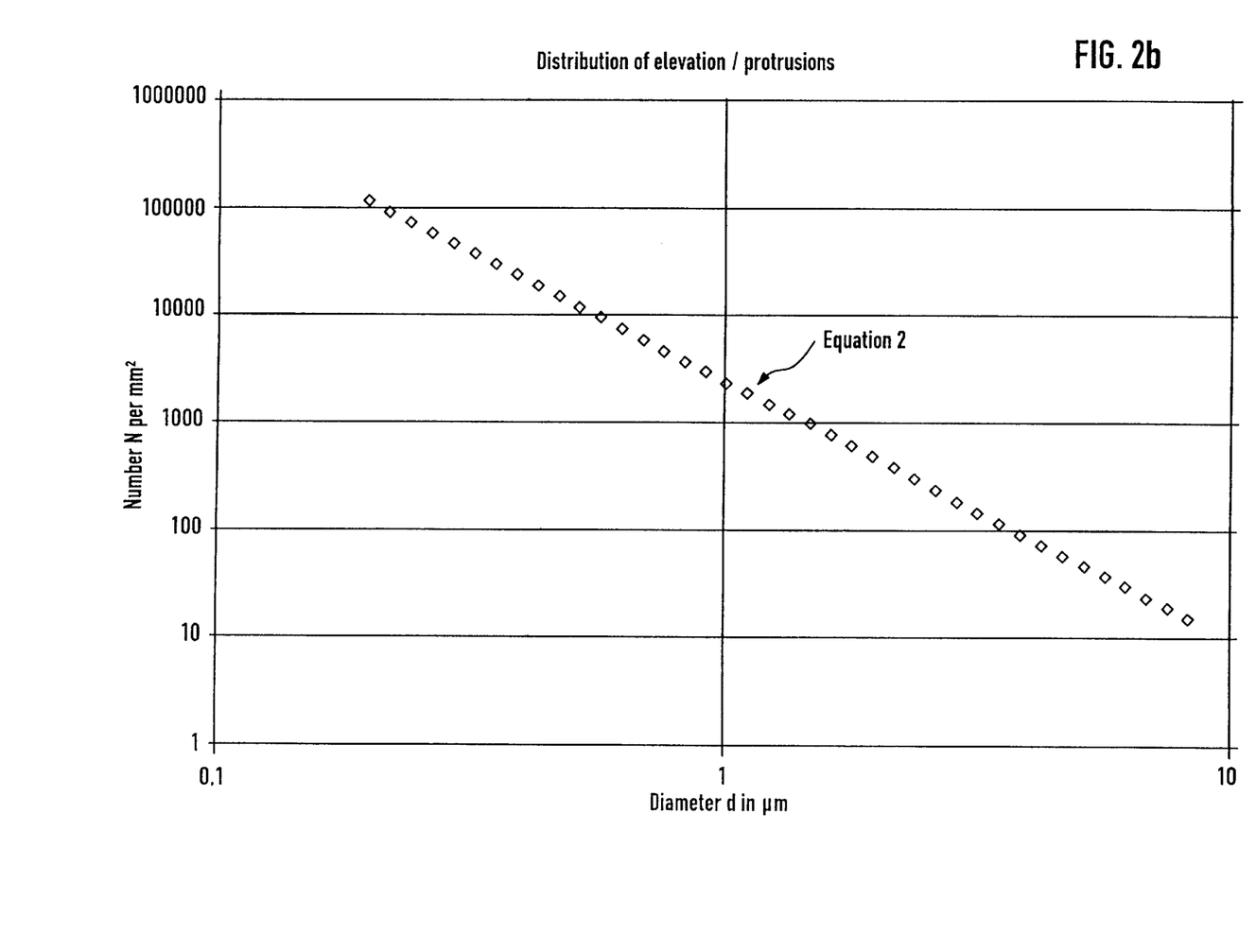

FIG. 2 shows equations (1) and (2) graphically. When shown using two logarithmic axes, both relationships are straight lines defined by the numerical values given.

Relationships similar to equations (1) and (2) are given in the prior art in the above mentioned texts EP-A-0 124 291 and EP-A-0 490 665. However, as already mentioned, the claims in these texts refer to films for which "the excellent slipperiness of the polyester film of this invention is simultaneously achieved by the presence of the many very minute protrusions (page 7)" and which contain "many inert solid fine particles (page 9)", and this is precisely not the case in the novel films.

Figure 3:
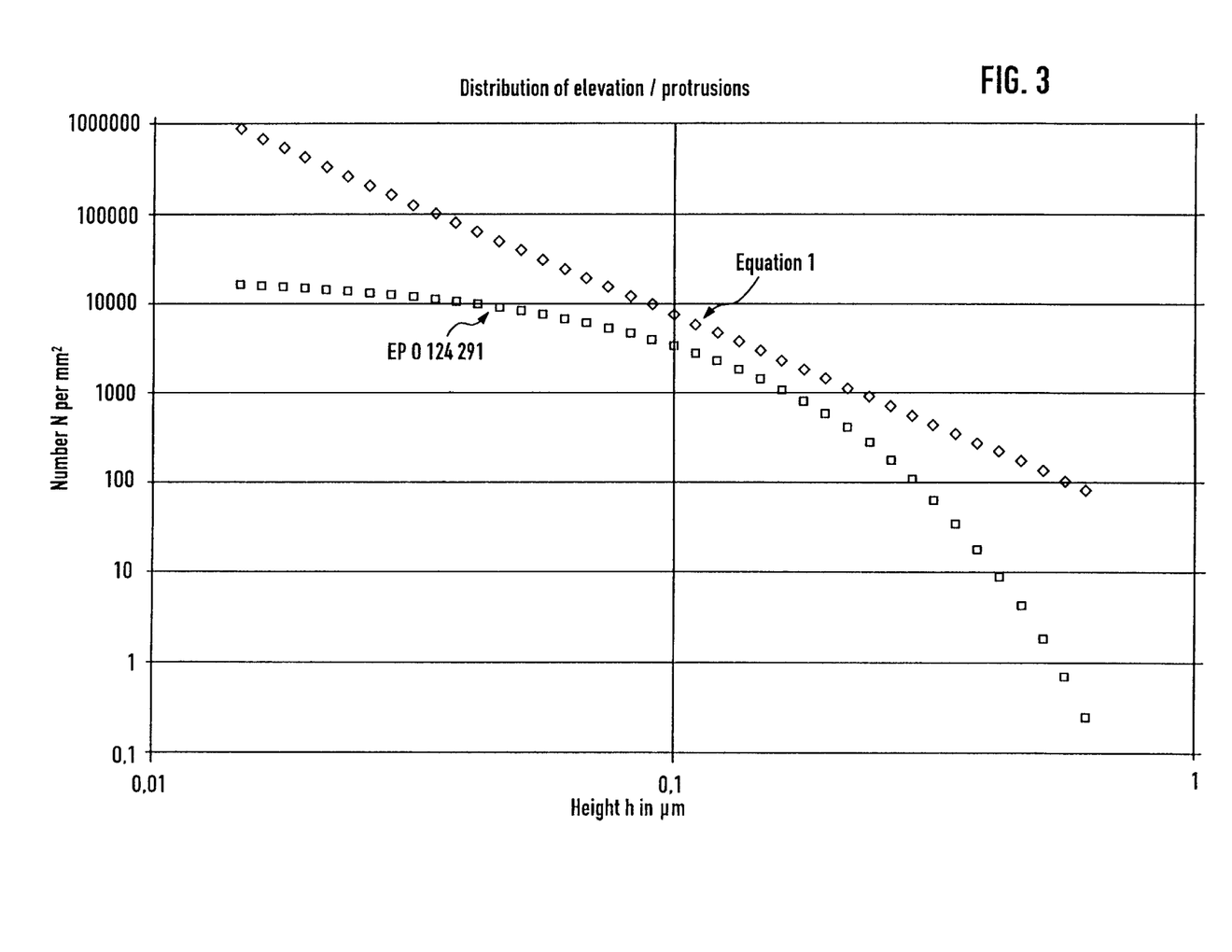
Figure 4:
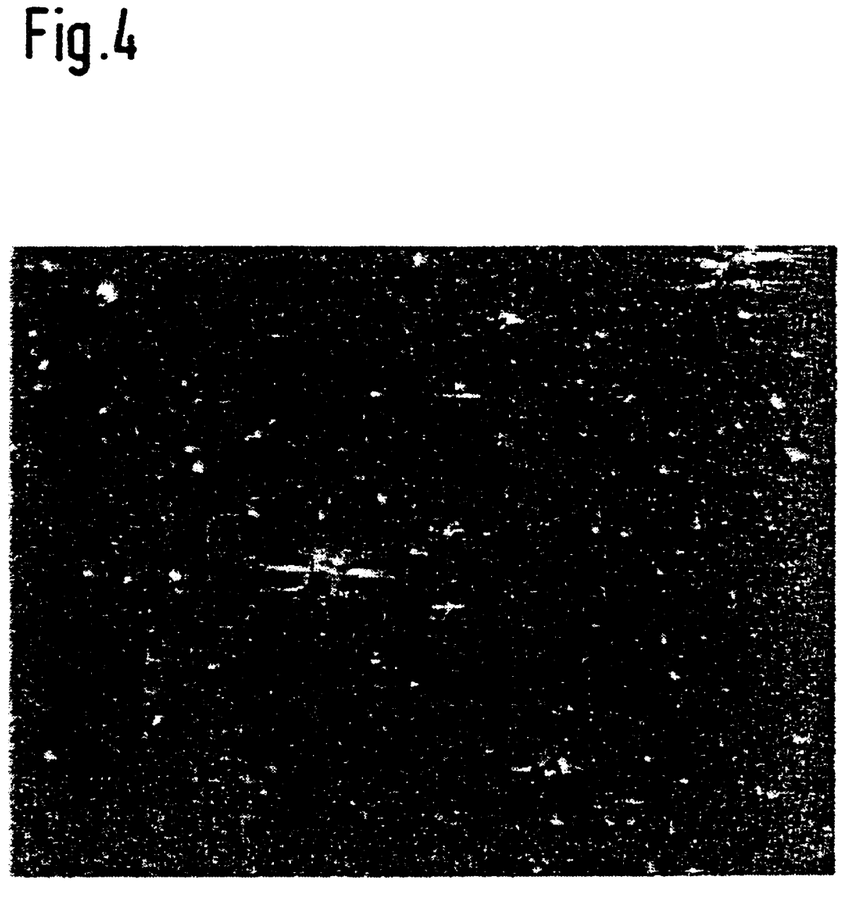

In addition, the measurement method used in the prior art is markedly different from that used in this application (cf. description of the measurement method on page 22). Corresponding to this, the topographies of the film surfaces may also differ, as is apparent on comparing the graphs (FIG. 3) and from the comparative examples. For further illustration of the differences between the measurement methods and of the resultant differences in the topography of the films, FIG. 4 shows an optical microscope scanned image (DIC, Differential Interference Contrast) of a polyester film. This image, taken using reflected light, shows a pigment-filled polyester film. In the method used here, as described on page 22, all of the elevations/protrusions are recorded by means of a scanning electron microscope and evaluated using an image analysis method. In contrast, the measurement method of the prior art uses a pin which scans the surface at certain distance intervals. As can be clearly seen in the image, straight line traces are left behind by the pin. The image also shows clearly that with this method only a few pigment particles are recorded and the pigment particles are encountered randomly.

The method of the prior art is thus not reproducible and gives false information. It gives the person skilled in the art no hint as to how the object of the present invention may be achieved.

The comparative examples show quantitatively that, when compared with the prior art, the above films have markedly different surfaces.

The subclaims give preferred embodiments of the invention, and these are additionally explained below.

DESCRIPTION OF THE EMBODIMENT OF THE INVENTION

In accordance with the invention, the film has at least two layers. The layers which it comprises are then a layer B and the metallized or ceramically coated outer layer A. In a preferred embodiment of the invention, the film has, on the one side of the layer B (base layer), the outer layer A and, on the other side of the layer B, another outer layer C which is made from polyethylene terephthalate and which contains the pigments useful for the production and processing of the film.

In principle, various raw materials may be used for the materials of the various layers. However, it is preferable that the production of the individual layers is based on polyester raw materials.

Base Material

The base layer B of the film is preferably composed of at least 90% by weight of a thermoplastic polyester. Polyesters suitable for this are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT) or from ethylene glycol, naphthalene-2,6-dicarboxylic acid and biphenyl-4,4'-dicarboxylic acid (polyethylene 2,6-naphthalate bibenzoate, PENBB). Particular preference is given to polyesters which are composed of at least 90 mol %, preferably at least 95 mol %, of ethylene glycol and terephthalic add units or of ethylene glycol and naphthalene-2,6-dicarboxylic acid units. The remaining monomer units are derived from other aliphatic, cycloaliphatic or aromatic diols and dicarboxylic acids, which may also be present in the outer layer.

Examples of other suitable aliphatic diols are diethylene glycol, triethylene glycol, aliphatic glycols of the formula $HO-(CH_2)_n-OH$, where n is an integer from 3 to 6, (in particular 1,3-propanediol, 1,4-butanediol, 1,5-pentanediol and 1,6-hexanediol), or branched aliphatic glycols having up to 6 carbon atoms. Of the cycloaliphatic diols, cyclohexanediols (in particular 1,4-cyclohexanediol) should be mentioned. Examples of other suitable aromatic diols are those of the formula $HO-C_6H_4-X-C_6H_4-OH$, where X is $-CH_2-$, $-C(CH_3)_2-$, $-C(CF_3)_2-$, $-O-$, $-S-$ or $-SO_2-$. Besides these, bisphenols of the formula $HO-C_6H_4-C_6H_4-OH$ are also very suitable.

Other preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Of the cycloaliphatic dicarboxylic acids, mention should be made of cyclohexanedicarboxylic acids (in particular cyclohexane-1,4-dicarboxylic acid). Particularly suitable aliphatic dicarboxylic acids are the $C_3-C_{19}$ alkanedioic acids, the alkane part of which may be straight-chain or branched.

The polyesters may be prepared by the transesterification process, the starting materials for which are dicarboxylic esters and diols, which are reacted using the customary transesterification catalysts, such as salts of zinc, calcium, lithium, magnesium and manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

Processes which have proven particularly suitable are those in which transesterification catalysts are used, with which only a small number of, and/or only very small, elevations/protrusions are created on the outer layer of the film. Magnesium salts and manganese salts are particularly preferred here. These transesterification catalysts are preferred for preparing the raw material for the base and are particularly preferred for preparing the raw material for the outer layer.

Films having the required topography (equations (1) and (2)) are obtained if (in particular for the outer layer in accordance with the invention) the row materials used are prepared using, for example, an Mn transesterification catalyst, an Mg transesterification catalyst or a Ca transesterification catalyst in which the Mn content is in the range from 50 to 200 ppm or the Mg content is in the range from 100 to 300 ppm or the Ca content is in the range from 50 to 300 ppm. This creates internal particles which give films having the surfaces in accordance with the invention. It is, however, also possible to use other transesterification catalysts.

The concentrations given here for the transesterification catalysts are based on raw materials for the outer layer in accordance with the invention in which no additional inert particles are used. In the case of addition of inert particles, it is expedient to reduce the content of internal particles.

Outer Layer Materials

In principle, the same polymers may be used for the outer layer as for the base layer. Besides these, other materials may also be present in the outer layer, in which case the outer layer may preferably be composed of a mixture of polymers, of a copolymer or of a homopolymer which contains ethylene 2,6-naphthalate units and ethylene terephthalate units. Up to 10 mol % of the polymers may be composed of other comonomers (see above).

For the other outer layer (outer layer C) or for any intermediate layers which may be present, it is possible in principle to use the polymers already described for the base layer and the outer layer A.

For processing the polymers, it has proven useful to select the polymers for the base layer and the outer layer(s) in such a way that the viscosities of the respective polymer melts do not differ excessively. Otherwise it is likely that there will be additional elevations/protrusions, flow disturbances or streaking in the finished film. To describe the viscosity ranges of the two melts, use is made of a modified solution viscosity (SV). For commercially available polyethylene terephthalates which are suitable for producing biaxially oriented films, the SV values are in the range from 600 to 1000. For the purposes of the present invention, to ensure a satisfactory film quality, the SV of the polymers for the outer layers should be in the range from 500 to 1200, preferably from 550 to 1150, particularly preferably from 600 to 1000. If necessary, a solid phase condensation may be carried out on the respective granules in order to adjust the SV values of the materials as necessary. The SV values of the polymer melts for the base layer and the outer layer(s) should not differ by more than 200 units, preferably by not more than 150 units and in particular by not more than 100 units.

Additives

The base layer and the outer layer(s) may also contain customary additives, such as stabilizers and/or antiblocking agents. They are expediently added to the polymer or to the polymer mixture before melting takes place. Examples of stabilizers are phosphorus compounds, such as phosphoric acid and phosphoric esters.

Typical antiblocking agents (also termed pigments in this context) are inorganic and/or organic particles, for example calcium carbonate, amorphous silicic acid, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin and crosslinked polystyrene particles and crosslinked acrylate particles.

Selected additives may also be mixtures of two or more different antiblocking agents or mixtures of antiblocking agents of the same formulation but of different particle size. The particles may be added to the individual layers in the respective advantageous concentrations, e.g. as glycolic dispersion during the polycondensation or via masterbatches during extrusion. Pigment concentrations of from 0 to 5% by weight have proven particularly suitable. A detailed description of the antiblocking agents is found, for example, in EP-A-0 602 964.

To fulfill the equations (1) to (5), the outer layer A in accordance with the invention is generally filled only slightly or not at all with inert pigments. The concentration of the inert particles in the outer layer is from 0 to 0.08% by weight, preferably from 0 to 0.065% by weight, in particular from 0 to 0.05% by weight, and depends essentially on the size of the particles used. Preferred particles are $SiO_2$ in colloidal and in chain form. There is no limit in principle on the particle diameters of the particles used. However, to achieve the object of the invention it has proven advantageous to use particles having an average primary particle diameter of less than 12 nm, preferably less than 8 nm and particularly preferably less than 6 nm and/or particles having an average primary particle diameter of greater than 1 $\mu$m, preferably greater than 1.5 $\mu$m and particularly preferably greater than 2 $\mu$m.

If no inert particles are added to the outer layer, it should be ensured, for example by a suitable selection and concentration of the catalysts for the transesterification or polymerization reaction, that the precipitates which form can prevent blocking of the outer layer surface with itself.

In selecting the pigments, the pigment diameter and the pigment concentration for the other layer(s) (e.g. for the layer B if the film has two layers or for the base layer B and the outer layer C if the film has three layers) care should be taken that the pigmentation in these layers is selected so that equations (1) to (5) are not contravened.

The pigmentation of the individual layers unrelated to the outer layer A can therefore vary greatly and depends essentially on the structure of the film (layer structure) and the requirements of the film with respect to behavior in production and processing.

For example, if the film has the preferred three layers, the base layer B and the two outer layers A and C, the particle concentration in the base layer B is then preferably lower than in the second outer layer C. The pigmentation in the base layer B should be selected so that it has no lasting effect on the number N of elevation/protrusions in the outer layer in accordance with the invention. In a film of the type mentioned having three layers, the particle concentration in the base layer B will be from 0 to 0.06% by weight, preferably from 0 to 0.04% by weight, in particular from 0 to 0.03% by weight. There is in principle no restriction on the particle diameter of the particles used, but those having an average diameter of great than 2 $\mu$m are preferred.

If the film is built up from two layers, the outer layer A making up more than 50% of the total thickness of the film, the layer B can then be much more strongly pigmented (with higher pigment concentration) than in the opposite case in which the thickness of the outer layer A is comparatively low (<50%).

In a particularly preferred embodiment, the novel polyester film also contains a second outer layer C. The structure, thickness and formulation of the second outer layer may be selected independently of the outer layer already present, but the second outer layer may likewise contain the polymers or polymer mixtures already mentioned, which, however, need not be identical with those of the first outer layer. The second outer layer may also contain other well known outer layer polymers. This second outer layer generally contains more pigments (i.e. higher pigment concentrations) than the first outer layer A in accordance with the invention. The pigment concentration in this second outer layer is from 0.02 to 0.4%, advantageously from 0.02 to 0.3% and very particularly from 0.02 to 0.2%. It depends, for example, on the desired processing behavior of the film. The pigment type(s), the pigment concentration(s) and the particle concentration(s) are preferably selected so that the film has good optical properties and is easy to produce and to process.

The ease of production and the ease of processing of the film are described here by the parameters:

a) average roughness $R_{a,c}$ b) static/sliding friction $\mu_c$ of this side with itself and c) the number $N_c/mm^2$ of elevations/protrusions on this side.

It is preferable if the film is constructed so that on this surface C which faces away from the outer layer in accordance with the invention a) $R_a$ is from 30 to 100 nm, preferably from 40 to 90 nm and particularly preferably from 45 to 80 nm b) the static/sliding friction $\mu_c$ of this layer with itself is less than 0.6, preferably less than 0.5 and particularly preferably less than 0.45 and c) the number $N_c/mm^2$ of elevations/protrusions is expressed by the equations $$A_{h2}-B_{h2} \,(\log h/\mu m) < \log N_c/mm^2 < A_{h3}-B_{h3} \,(\log h/\mu m) \qquad (3)$$

$0.01 \,\mu m < h < 10 \,\mu m$
$A_{h2}=1.42; B_{h2}=2.5$
$A_{h3}=2.0; B_{h3}=3.0$ (see FIG. 5a)

$$A_{d2}-B_{d2} \,(\log d/\mu m) < \log N_c/mm^2 < A_{d3}-B_{d3} \,(\log d/\mu m) \qquad (4)$$

$0.01 \,\mu m < d < 10 \,\mu m$
$A_{d2}=3.4; B_{d2}=2.4$
$A_{d3}=4.0; B_{d3}=3.3$ (see FIG. 5b)

Between the base layer and the outer layer(s) there may, if desired, also be an intermediate layer, which may be composed of the polymers described for the base layers. In a particularly preferred embodiment, it is composed of the polyester used for the base layer. It may also contain the customary additives described. The thickness of the intermediate layer is generally greater than 0.3 $\mu$m and is preferably in the range from 0.5 to 15 $\mu$m, in particular from 1.0 to 10 $\mu$m.

The thickness of the outer layer(s) A (and C) is generally greater than 0.1 $\mu$m and is generally in the range from 0.2 to 3.0 $\mu$m, advantageously in the range from 0.2 to 2.5 $\mu$m, and particularly advantageously from 0.3 to 2 $\mu$m, and the outer layers may be of identical or different thicknesses.

The total thickness of the novel polyester film can vary within wide limits and depends on the intended application. It is from 4 to 50 $\mu$m, in particular from 5 to 40 $\mu$m, preferably from 6 to 30 $\mu$m, the base layer being a proportion of from 40 to 90% of the total thickness.

To prepare the outer layer(s), it is expedient to feed pellets of polyethylene terephthalate to one or two extruders. The materials are melted at about 300° C. and extruded.

The polymers for the base layer are expediently fed through another extruder. Any foreign bodies or contamination which may be present can be screened out from the polymer melt before extrusion. The melts are then shaped in a coextrusion die to give flat melt films, and are laminated together. The multilayer film is then drawn off and solidified with the aid of a chili roll and, if desired, other rolls.

The biaxial orientation is generally carried out sequentially. For this, it is preferable to orientate firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends on the film properties desired. In general, the longitudinal stretching is carried out at from 80 to 130° C., and the transverse stretching at from 90 to 150° C. The longitudinal stretching ratio is generally in the range from 2.5:1 to 6:1, preferably 3:1 to 5.5:1. The transverse stretching ratio is generally in the range from 3.0:1 to 5.0:1, preferably from 3.5:1 to 4.5:1. Before the transverse stretching, one or both film surfaces may be in-line coated by the known processes. The in-line coating may, for example, serve to improve the adhesion of the metallic layer or of any printing ink which may be applied, or else to improve the antistatic or processing behavior.

In the subsequent heat-setting, the film is held for from 0.1 to 10 s at a temperature of from 150 to 250° C. The film is then wound in a customary manner.

Before applying the metallic or ceramic layer on one or both sides, the biaxially oriented and heat-set polyester film may be corona- or flame-treated. The intensity of treatment is selected so that the surface tension of the film is generally greater than 45 mN/m.

Metallic or ceramic layers are expediently applied in well known industrial systems. Metallic layers of aluminum are usually produced by metallizing, while ceramic layers may, in addition, also be created using electron-beam processes or application by sputtering. The process parameters in the system during application of the metallic or ceramic layer to the films correspond to the standard conditions. The metallizing of the films is preferably carried out so that the optical density of the metallized films is in the usual range of from about 2.2 to 2.8. The application of the ceramic layer to the film is carried out so that the layer thickness of the oxide layer is preferably in the range from 30 to 100 nm. The web speed of the film to be coated is usually from 5 to 10 m/s for all settings of variables. The use of a laboratory metallizing system for the metallization was avoided, since experience has shown that this generally gives significantly better barrier values which cannot be used for comparison purposes.

The film may be coated or corona- or flame-pretreated to establish other desired properties. Typical coatings are those which promote adhesion, are antistatic, improve slip or have release action. These additional coatings may be applied to the film via in-line coating using aqueous dispersions, before the transverse orientation.

The metallic layer is preferably composed of aluminum. However, other materials which can be applied in the form of a thin, cohesive layer are also suitable. Silicon, for example, is particularly suitable and, in contrast to aluminum, gives a transparent barrier layer. The ceramic layer is preferably composed of oxides of elements of the 2nd, 3rd or 4th main group of the Periodic Table, in particular oxides of magnesium, aluminum or silicon. Use is generally made of those metallic or ceramic materials which can be applied at reduced pressure or in a vacuum. The thickness of the layer applied is generally from 10 to 100 nm.

A further advantage is that the production costs of the novel film are comparable with those of the prior art. The other properties of the novel film which are relevant to its processing and use are essentially unchanged or even improved. Besides this, it has been ensured that rework can be used during the production of the film in a concentration of from 20 to 50% by weight, based on the total weight of the film, without any significant adverse effect on the physical properties of the film.

The film has excellent suitability for packaging of foodstuffs and luxury foods which are sensitive to light and/or air. It is particularly suitable for producing vacuum packs for coffee, in particular ground coffee.

The following methods were used to determine parameters for the raw materials and the films:

(1) Optical Density

The Macbeth TD-904 Densitometer from Macbeth (Division of Kollmorgen Instruments Corp.) was used to measure the optical density. The optical density is defined as $OD=-\lg I/I_0$, where I is the intensity of the incident light, $I_0$ is the intensity of the transmitted light and $I/I_0$ is the transmittance.

(2) Oxygen Barrier

The oxygen barrier of the metallized films was measured using an OX-TRAN 2/20 from Mocon Modem Controls (USA) in accordance with DIN 53 380, Part 3.

(3) SV

The SV (solution viscosity) was determined by dissolving a specimen of polyester in a solvent (dichloroacetic acid) at standard conditions. The viscosity of this solution and that of the pure solvent were measured in an Ubbelohde viscometer. The quotient was determined from the two values, 1.000 was subtracted from this, and this value multiplied by 1000. The result was the SV.

(4) Coefficient of Friction

The coefficient of friction was determined according to DIN 53 375, the coefficient of sliding friction being measured 14 days after production. Blocking takes place if the coefficient of friction is greater than 1.

(5) Surface Tension

The surface tension was determined using the "ink method" (DIN 53 364).

(6) Haze

The haze of the film was measured according to ASTM-D 1003-52. The Hölz haze was determined by a method based on ASTM-D 1003-52, but, in order to utilize the most effective measurement range, measurements were made on four pieces of film laid one on top of the other, and a 1° slit diaphragm was used instead of a 4° pinhole.

(7) Gloss

Gloss was measured according to DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed, representing the light beams hitting the photoelectric detector. The value measured is dimensionless and must be stated together with the angle of incidence.

(8) Determination of the Particle Sizes on Film Surfaces

A scanning electron microscope (e.g. DSM 982 Gemini, Leo GmbH (Zeiss)) together with an image analysis system was used to determine the size distribution of particles of antiblocking agent (particle size distribution) on film surfaces. The magnifications selected in all cases were 1700 times.

For these measurements, specimens of film are placed flat on a specimen holder. These are then metallized obliquely at an angle α with a thin metallic layer (e.g. of silver). α here is the angle between the surface of the specimen and the direction of diffusion of the metal vapor. The antiblocking agent particles throw a shadow in this oblique metallization. Since the shadows are not yet electrically conductive, the specimen can then be further metallized with a second metal (e.g. gold), the metal vapor here impacting vertically onto the surface of the specimen.

Scanning electron microscope (SEM) images are taken of specimen surfaces prepared in this way. The shadows of the particles of antiblocking agent are visible because of the contrast between materials. The specimen is oriented in the SEM so that the shadows run parallel to the lower edge of the image (x direction). SEM images are taken with this setting and transferred to an image analysis system. This image analysis system is used to make precise measurements of the lengths of the shadows (in the x direction) and their maximum extent in the y direction (parallel to the vertical edge of the image).

The diameter D of the particles of antiblocking agent at the surface level of the specimen is equal to the maximum extent of the shadows d in the y direction. The height of the particles of antiblocking agent, measured from the film surface, can be calculated from the angle α of metallization and the length L of the shadows, given knowledge of the magnification V selected for the SEM image:

$$h=(\tan(\alpha) * L)/V$$

So as to achieve a sufficiently high level of statistical reliability, precise measurements are made of a few thousand particles of antiblocking agent. With the aid of known statistical methods, frequency distributions are then produced for the diameters and heights of the particles. The class interval selected for this is 0.2 μm for the particle diameter D and 0.05 μm for the particle height h.

EXAMPLE 1

Polyethylene terephthalate chips (prepared via the transesterification process using Mn as transesterification catalyst; Mn concentration: 100 ppm) were dried at 160° C. to a residual moisture of less than 50 ppm and fed to the extruder for the base layer B.

In addition, polyethylene terephthalate chips (prepared via the transesterification process using Mn as transesterification catalyst; Mn concentration: 100 ppm) which have been pigmented as shown in Table 2 were likewise dried at 160° C. to a residual moisture of less than 50 ppm and fed to the respective extruders for the outer layers A and C.

A transparent film having three layers, ABC structure and a total thickness of 12 μm was produced by coextrusion followed by stepwise orientation in longitudinal and transverse directions. The thickness of the respective layers is given in Table 2.

Outer layer A is a mixture of:

| | |
|---|---|
| 94.0% by weight of | polyethylene terephthalate RT 49 from Hoechst AG having an SV of 800 |
| 6.00% by weight of | masterbatch mode from 99.0% by weight of polyethylene terephthalate (SV of 800) and 0.5% by weight of Sylobloc 44 H (Grace) and 0.5% by weight of Aerosil TT 600 (Degussa) |

Base layer B:

| | |
|---|---|
| 100.0% by weight | of polyethylene terephthalate RT 49 from Hoechst AG having an SV of 800 |

Outer layer C is a mixture of:

| | |
|---|---|
| 84.0% by weight | of polyethylene terephthalate RT 49 from Hoechst AG having an SV of 800 |
| 16.0% by weight | of masterbatch made from 99.0% by weight of polyethylene terephthalate and 0.5% by weight of Sylobloc 44 H (Grace) and 0.5% by weight of Aerosil TT 600 (Degussa) |

The production conditions for the individual process steps were:

| | | |
|---|---|---|
| Extrusion: | Temperatures | |
| | Layer A: | 300° C. |
| | Layer B: | 300° C. |
| | Layer C: | 300° C. |
| | Temperature of the take-off roll: | 30° C. |
| | Die gap width: | 1 mm |
| | Temperature of the take-off roll: | 30° C. |
| Longitudinal stretching: | Temperature: | 80-125° C. |
| | Longitudinal stretching ratio: | 4.0 |
| Transverse stretching: | Temperature: | 80-135° C. |
| | Transverse stretching ratio: | 4.0 |
| Setting: | Temperature: | 230° C. |
| | Duration: | 3 s |

After the film had been produced (in this Example and in all examples below) it was metallized on the side A with aluminum in a vacuum in an industrial metallizer. The coating speed was 6 m/s and the optical density was 2.6.

Figure 6:
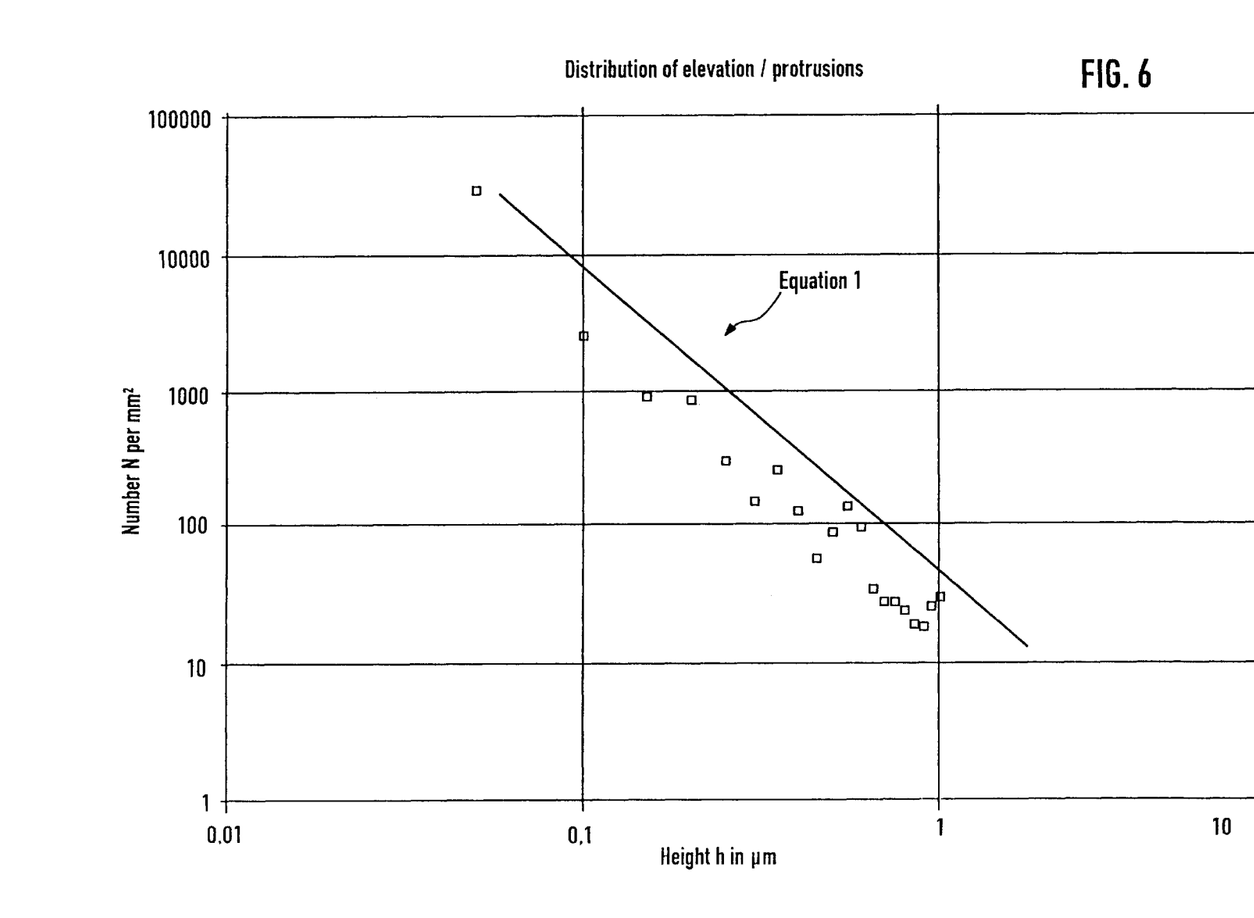

The film exhibited the required oxygen barrier. The structure of the film and the properties achieved in films produced in this way are presented in Tables 1 and 2. FIG. 6 shows the distributions for the elevations/protrusions N measured for the outer layer A using the method described on page 22.

EXAMPLE 2

A transparent film having three layers, ABC structure and a total thickness of 12 μm was prepared by coextrusion followed by stepwise orientation in longitudinal and transverse directions, in a similar manner to that of Example 1. Compared with Example 1, only the outer layer A was changed.

Outer layer A is a mixture of:

| | |
|---|---|
| 98.0% by weight of | polyethylene terephthalate RT 49 from Hoechst AG having an SV of 800 |
| 2.00% by weight of | masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 3

A transparent film having three layers, ABC structure and a total thickness of 12 μm was prepared by coextrusion followed by stepwise orientation in longitudinal and transverse directions, in a similar manner to that of Example 1. Compared with Example 1, only the outer layer A was changed.

Outer layer A is a mixture of:

| | |
|---|---|
| 99.0% by weight of | polyethylene terephthalate RT 49 from Hoechst AG having an SV of 800 |
| 1.00% by weight of | masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 4

A transparent film having three layers, ABC structure and a total thickness of 12 μm was prepared by coextrusion followed by stepwise orientation in longitudinal and transverse directions, in a similar manner to that of Example 1. Compared with Example 1, only the outer layer A was changed.

Outer layer A is a mixture of:

| | |
|---|---|
| 98.0% by weight of | polyethylene terephthalate RT 49 from Hoechst AG having an SV of 800 |
| 2.00% by weight of | masterbatch made from 99.75% by weight of polyethylene terephthalate (SV of 800) and 0.25% by weight of Aerosil TT 600 (Degussa) |

The process conditions selected for all layers were as in Example 1.

EXAMPLE 5

A transparent film having three layers, ABC structure and a total thickness of 12 μm was prepared by coextrusion followed by stepwise orientation in longitudinal and transverse directions, in a similar manner to that of Example 1. Compared With Example 1, only the outer layer A was changed.

Outer layer A is a mixture of:

| 98.0% by weight of | polyethylene terephthalate RT 49 from Hoechst AG having an SV of 800 |
|---|---|
| 2.00% by weight of | masterbatch made from 99.75% by weight of polyethylene terephthalate (SV of 800) and 0.25% by weight of Sylobloc 44 H (Grace) |

The process conditions selected for all layers were as in Example 1.

EXAMPLE 6

A transparent film having three layers, ABC structure and a total thickness of 12 μm was prepared by coextrusion followed by stepwise orientation in longitudinal and transverse directions, in a similar manner to that of Example 1. Compared with Example 1, only the outer layer A was changed.

Outer layer A is a mixture of:

| 100.0% by weight of | polyethylene terephthalate VR 49 from Hoechst AG having an SV of 800 |
|---|---|

The polyester raw material for the outer layer A was prepared via the transesterification process using Ca as transesterification catalyst, the Ca concentration being 200 ppm.

EXAMPLE 7

A transparent film having three layers, ABC structure and a total thickness of 12 μm was prepared by coextrusion followed by stepwise orientation in longitudinal and transverse directions, in a similar manner to that of Example 1. Compared with Example 1, the outer layers A and C were changed.

Outer layer A is a mixture of:

| 98.0% by weight of | polyethylene terephthalate having an SV of 800 |
|---|---|
| 2.00% by weight of | masterbatch made from 99.0% by weight of polyethylene terephthalate (SV of 800) and 1.0% by weight of Sylobloc 44 H (Grace) |

Outer layer C is a mixture of:

| 90.0% by weight of | polyethylene terephthalate having an SV of 800 |
|---|---|
| 10.0% by weight of | masterbatch made from 99.0% by weight of polyethylene terephthalate (SV of 800) and 1.0% by weight of Sylobloc 44 H (Grace) |

EXAMPLE 8

A transparent film having three layers, ABC structure and a total thickness of 12 μm was prepared by coextrusion followed by stepwise orientation in longitudinal and transverse directions, in a similar manner to that of Example 7. Compared with Example 1, the outer layer A was changed.

Outer layer A is a mixture of:

| 91.0% by weight of | polyethylene terephthalate having an SV of 800 |
|---|---|
| 1.00% by weight of | masterbatch made from 99.0% by weight of polyethylene terephthalate (SV of 800) and 1.0% by weight of Sylobloc 44 H (Grace) |

The process conditions selected for all layers were as in Example 1. Although no extra inert pigments were added to the outer layer A and the base layer B, the surface of the outer layer A contains elevations/protrusions. These stem, inter alia, from the transesterification catalyst precipitates and variations in the processes of raw material preparation and film production.

COMPARATIVE EXAMPLE 1

Example 1 of EP-A-0 124 291 was repeated.

COMPARATIVE EXAMPLE 2

Example 1 of EP-A-0 490 665 was repeated.

COMPARATIVE EXAMPLE 3

Example 1 of DE-A-16 94 404 was repeated.

COMPARATIVE EXAMPLE 4

Example 15 of EP-A-0 061 769 was repeated.

COMPARATIVE EXAMPLE 5

Example 1 of EP-B-0 088 635 was repeated.

TABLE 1

| Example | Film thickness μm | Film structure | Layer thicknesses A | B | C μm | Pigments in the layers A | B | C | Average pigment diameter A | B | C μm | Pigment concentration A | B | C ppm |
|---|---|---|---|---|---|---|---|---|---|---|---|---|---|---|
| Example 1 | 12 | ABC | 1.0 | 9.5 | 1.5 | Sylobloc 44 H Aerosil TT 600 | none | Sylobloc 44 H Aerosil TT 600 | 2.5 0.005 | | 2.5 0.005 | 300 300 | 0 | 800 800 |
| Example 2 | 12 | ABC | 1.0 | 9.5 | 1.5 | Sylobloc 44 H Aerosil TT 600 | none | Sylobloc 44 H Aerosil TT 600 | 2.5 0.005 | | 2.5 0.005 | 100 100 | 0 | 800 800 |
| Example 3 | 12 | ABC | 1.0 | 9.5 | 1.5 | Sylobloc 44 H Aerosil TT 600 | none | Sylobloc 44 H Aerosil TT 600 | 2.5 0.005 | | 2.5 0.005 | 50 50 | 0 | 800 800 |
| Example 4 | 12 | ABC | 1.0 | 9.5 | 1.5 | Aerosil TT 600 | none | Sylobloc 44 H Aerosil TT 600 | 0.005 | | 2.5 0.005 | 0 50 | 0 | 800 800 |
| Example 5 | 12 | ABC | 1.0 | 9.5 | 1.5 | Sylobloc 44 H | none | Sylobloc 44 H Aerosil TT 600 | 2.5 | | 2.5 0.005 | 50 0 | 0 | 800 800 |
| Example 6 | 12 | ABC | 1.0 | 9.5 | 1.5 | | none | Sylobloc 44 H Aerosil TT 600 | | | 2.5 0.005 | 0 0 | 0 | 800 800 |
| Example 7 | 12 | ABC | 1.0 | 9.5 | 1.5 | Sylobloc 44 H | none | Sylobloc 44 H | 2.5 | | 2.5 | 200 | 0 | 1000 |
| Example 8 | 12 | ABC | 1.0 | 9.5 | 1.5 | Sylobloc 44 H | none | Sylobloc 44 H | 2.5 | | 2.5 | 100 | 0 | 1000 |
| Comp. Ex. 1 | 10 | A | — | — | — | Anatase-TiO$_2$ | | | 0.4 | | | 1500 | | |
| Comp. Ex. 2 | 14 | A | — | — | — | θ-Al$_2$O$_3$ | | | 0.2 | | | 3000 | | |
| Comp. Ex. 3 | 25 | ABA | 2.5 | 20 | 2.5 | kaolin | — | kaolin | 4 | | 4 | 1250 | | 1250 |
| Comp. Ex. 4 | 15 | AB | 7.5 | 7.5 | — | zinc acetate antimony trioxide | kaolin + lubricant as coating | | | | | 230 400 | 5000 + solution | |
| Comp. Ex. 5 | 12 | AB | 6 | 6 | — | — | Internal particles | | 1.5 | | | 2000 | | |

TABLE 2

| Example | Constants for the height distribution of the particles Side A | Side C | Constants for the thickness distribution of the particles Side A | Side C | Oxygen barrier cm$^3$/m$^2$ bar d | Coefficient of friction μk A/A | C/C | Roughness R$_a$ Side A nm | Side C nm | Gloss[1] Side A | Side C | Haze[1] % | Processing behavior |
|---|---|---|---|---|---|---|---|---|---|---|---|---|---|
| Example 1 | 1.3/2.45 | 1.5/2.6 | 3.3/2.4 | 3.5/3.1 | 0.45 | 0.45 | 0.4 | 25 | 60 | 185 | 180 | 1.7 | very good |
| Example 2 | 1.25/2.4 | 1.5/2.6 | 3.2/2.3 | 3.5/3.1 | 0.43 | 0.5 | 0.4 | 20 | 60 | 190 | 180 | 1.3 | very good |
| Example 3 | 1.2/2.2 | 1.5/2.6 | 3.18/2.3 | 3.5/3.1 | 0.43 | 0.55 | 0.4 | 18 | 60 | 190 | 180 | 1.3 | very good |
| Example 4 | 1.18/2.2 | 1.5/2.6 | 3.1/2.3 | 3.5/3.1 | 0.42 | 0.65 | 0.4 | 12 | 60 | 195 | 180 | 1.2 | good |
| Example 5 | 1.16/2.2 | 1.5/2.6 | 3.1/2.3 | 3.5/3.1 | 0.41 | 0.65 | 0.4 | 15 | 60 | 195 | 180 | 1.1 | good |
| Example 6 | 1.12/2.15 | 1.5/2.6 | 3.0/2.3 | 3.5/3.1 | 0.40 | 0.65 | 0.4 | 11 | 60 | 200 | 180 | 1.1 | good |
| Example 7 | 1.25/2.4 | 1.65/2.7 | 3.3/2.3 | 2.8/3.1 | 0.42 | 0.55 | 0.3 | 25 | 70 | 190 | 160 | 1.3 | good |
| Example 8 | 1.2/2.3 | 1.65/2.7 | 3.1/2.3 | 2.8/3.1 | 0.42 | 0.6 | 0.3 | 18 | 70 | 195 | 160 | 1.1 | good |
| Comp. Ex. 1 | 1.1/2.9 | 1.1/2.8 | 4/3.5 | 4/3.5 | 2.4 | 0.15 | | 10 | | 130 | | 7 | good |
| Comp. Ex. 2 | 1.0/3.0 | 1.0/3.0 | 4/3.2 | 3.9/3.1 | 3.1 | 0.2 | | 20 | | 120 | | 9 | good |
| Comp. Ex. 3 | 1.6/2.5 | 1.6/2.5 | 3.4/3.5 | 3.4/3.5 | 1.7 | 0.4 | | 75 | | 175 | | 1.5 | good |
| Comp. Ex. 4 | — | — | | | 1.8 | blocks | 0.4 | 3.6 | 15 | 175 | 130 | 9 | poor |
| Comp. Ex. 5 | — | — | | | 0.45 | blocks | 0.3 | 3 | 14 | 180 | 150 | 5 | very poor |

[1] Measured on the unmetallized film
Side A: metallized outer layer
Side C: unmetallized outer layer

What is claimed is:

1. A biaxially oriented, coextruded polyester film having a base layer composed of at least 80% by weight of a thermoplastic polyester and one or more outer layers, where at least one outward-facing outer layer contains particles and is provided with a metallic or ceramic layer, and where the outward-facing outer layer has a number of elevations/protrusions N per mm$^2$ of film surface area which is related to their respective heights h and diameters at film surface level d by the following equations $$\log N/mm^2 \leq A_h - B_h(\log h/\mu m), \quad 0.01 \ \mu m < h < 10 \ \mu m \quad (1)$$

$A_h = 1.4$; $B_h = 2.5$ $$\log N/mm^2 \leq A_d - B_d(\log d/\mu m), \quad 0.01 \ \mu m < d < 10 \ \mu m \quad (2)$$

$A_d = 3.4$; $B_d = 2.4$.

2. A polyester film as claimed in claim 1, wherein the outward-facing outer layer contains less than 0.02% by weight of an inert filler.

3. A polyester film as claimed in claim 1, wherein the metallized film has an oxygen transmission which is less than 0.5 cm$^3$/m$^2$ bar d.

4. A polyester film as claimed in claim 1, wherein the metallized film has an oxygen transmission which is less than 0.45 cm$^3$/m$^2$ bar d.

5. A polyester film as claimed in claim 1, wherein the outward-facing outer layer has a higher glass transition temperature than the base layer.

6. A polyester film as claimed in claim 1, wherein the outward-facing outer layer has a thickness of from 0.1 to 5.0 μm.

7. A polyester film as claimed in claim 1, wherein the film is built up from two layers and is composed of the metallized outward-facing outer layer and the unmetallized base layer.

8. A polyester film as claimed in claim 1, which is built up from three layers and is composed of the metallized outward-facing outer layer, the base layer and an unmetallized outer layer, which is applied to the side of the base layer opposite to that of the metallized outer layer.

9. A polyester film as claimed in claim 8, wherein the unmetallized outer layer is pigmented.

10. A polyester film as claimed in claim 1, wherein the metallized outward-facing outer layer is pigmented.

11. A polyester film as claimed in claim 1, wherein at least the outward-facing outer layer is in-line coated.

12. A method for using a film as claimed in claim 1 for packaging of foodstuffs, comprising:

providing the film; and packaging foodstuffs using the film.

\* \* \* \* \*